United States Patent [19]
Sherwin

[11] 3,729,710
[45] Apr. 24, 1973

[54] FREQUENCY SELECTIVE REMOTE CONTROL SYSTEM

[75] Inventor: Russell Sherwin, Sunnyvale, Calif.
[73] Assignee: Western Microwave Laboratories, Inc., Los Gatos, Calif.
[22] Filed: Dec. 28, 1971
[21] Appl. No.: 213,001

[52] U.S. Cl. ............................. 340/171 R, 340/310
[51] Int. Cl. .......................... H04q 9/00, H04q 11/04
[58] Field of Search ................ 340/171, 163, 147 LP, 340/310

[56] References Cited

UNITED STATES PATENTS

3,689,886  9/1972  Durkee ............................ 340/310 X
3,691,528  9/1972  Calvagna ........................ 340/147 LP

*Primary Examiner*—Donald J. Yusko
*Attorney*—George H. Spencer et al.

[57] ABSTRACT

A system for selectively controlling the operation of a plurality of devices, e.g., the electrically operable water valves for an irrigation system, which are coupled across a two-wire power line. Each of the devices is provided with a frequency responsive circuit or decoder which responds to a signal of only a single frequency to connect the device across the line. The control of the decoders is provided by the output signal of an N-channel encoder which, although it can generate only a single frequency at a time, provides a sequence of the selected frequencies needed to operate selected devices in time multiplex. By providing each of the decoders with a capacitive circuit which has a fast charge-slow discharge characteristic in response to a signal of the associated predetermined frequency, and by rapid time sequencing of the signals produced by the fixed encoder, it is possible to simultaneously operate any number of the devices in a random fashion. To provide local selective control of any one of the devices, the system also includes a portable encoder which can selectively produce a signal of any one of the predetermined frequencies necessary to operate a device. When energized, the portable encoder also provides a high frequency output signal which disables the fixed encoder. Preferably, in order that the system be simple and as inexpensive as possible, output signals from the encoders are transmitted to the decoders and the pilot frequency output of the portable encoder is transmitted to the fixed encoder by superimposing the output signal from the encoders on the power line signal. To achieve this, plug-in connections are provided for the portable encoder at spaced locations along the power line.

18 Claims, 5 Drawing Figures

FREQUENCY SELECTIVE REMOTE CONTROL SYSTEM

BACKGROUND OF THE INVENTION

The present invention relates to a frequency responsive control system, and more particularly to a remotely operated control system wherein a plurality of spaced devices may be selectively simultaneously energized utilizing a two-wire power line. More particularly, the present invention relates to a system for control of the water valves in an automatic irrigation or sprinkler system which could be utilized, for example, to water the fairways and greens of a golf course.

Automatically controlled irrigation systems have been known in the art. Such systems are generally of a type wherein each sprinkler valve, in the event selective energization thereof is required, is controlled by a separate wire system from a central control location. Although sprinkler control systems utilizing only a two-wire power line have also become known in the art, such systems do not permit the random selection of the particular valves to be energized, which is often desirable, but rather require that the valves be energized in a particular sequence.

In addition to the capability of being able to randomly control the various valves from a control location, in such sprinkler-irrigation control systems it is also often desirable to be able to control a particular valve and the operation of the entire system from a location which is removed from the central control point, e.g., the location of a particular valve. No provision for this type of supplemental control has been made in any of the prior art systems.

SUMMARY OF THE INVENTION

It is therefore an object of the present invention to provide an improved system for selectively controlling a plurality of devices coupled to a two-wire power line.

It is a further object of the present invention to provide a frequency selective remote control system whereby a plurality of devices coupled to a two-wire power line may be selectively and simultaneously operated.

It is still a further object of the present invention to provide an improved frequency responsive system for selectively operating one or more sprinkler valves from a remote location and which moreover provides for localized control of a particular sprinkler valve.

The above objects are achieved according to the present invention by providing each of the electrically operable devices, e.g., the sprinkler valves, with a frequency selective circuit which responds to an input signal of only a single different predetermined frequency to connect the associated device across the two-wire power line. A stationary fixed encoder circuit having its output connected to the inputs of each of the frequency selective circuits or decoders selectively provides the output signals of selected frequencies for energizing the desired valves. The fixed encoder circuit provides the different frequency signals in time division multiplex. In order to permit a plurality of the devices to be energized at the same time, each of the decoders includes a capacitive circuit having a fast charge-slow discharge characteristic.

To provide for the local control for the circuit, a portable encoder which selectively provides an output signal having only one of the predetermined frequencies to which the decoders respond is provided. The portable encoder, when energized, also provides a further output signal whose frequency is high relative to the frequencies of the signals used for the control of the valves, and which high frequency signal is detected by the fixed encoder and disables the output signals therefrom.

According to a further feature of the invention, the frequency control signals and the pilot time signal produced by the portable encoder are transmitted to the decoding circuits and the fixed encoder respectively by modulating the power line signal with the output signal from the encoders. Preferably the output signals of the encoders are coupled to the power line by means of shunt modulators. In the case of the portable encoder, according to still a further feature of the invention, plug-in connections for the portable encoder are provided at spaced intervals along the power line which both couple the output signals from the portable encoder to the power line and provide the supply voltage for the portable encoder.

According to still a further feature of the invention, in order to provide the system with more flexibility, instead of directly controlling each of the valves from a single central controller, or fixed encoder, a plurality of such fixed encoders or controllers may be provided at spaced locations in the field with each of these field controllers directly controlling only a portion of the total number of valves. The master or central controller in such case need only contain provision for selectively turning the field controllers on or off or possibly advancing the field controllers to a home program position. Control of the field controllers may be by means of additional selective frequency signals, one for each of the field controllers. In such a system, the portable encoder may also be additionally provided with means for selectively generating the tones necessary to control the field controllers whereby the plurality of valves associated with a particular field controller may be temporarily controlled by the portable encoder.

DESCRIPTION OF THE PREFERRED EMBODIMENTS

Figures 1, 3:
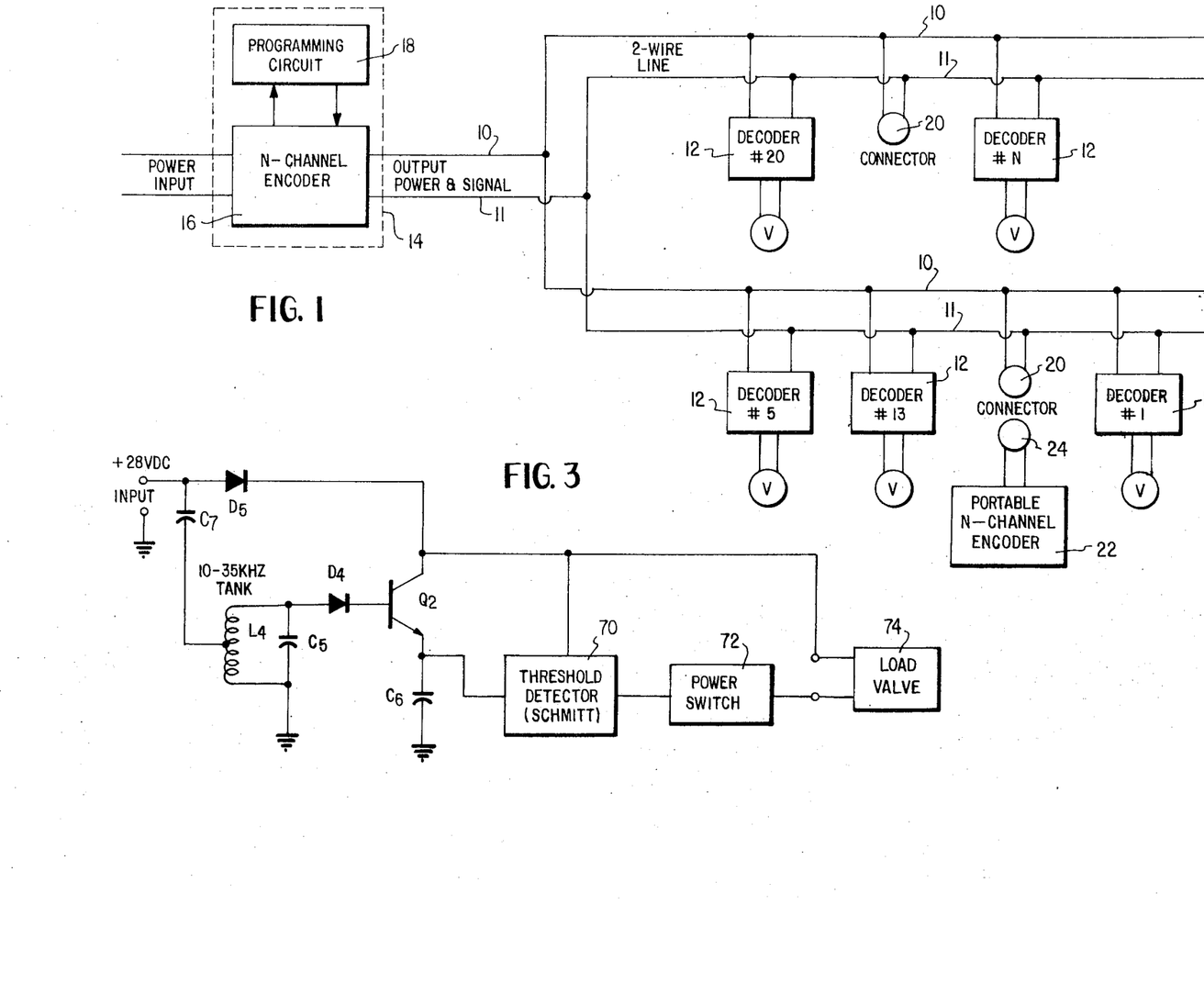
FIG. 1 is a block diagram of the basic system according to the invention for remotely controlling a plurality of sprinkler valves.
FIG. 3 is a schematic circuit diagram of the preferred embodiment of the decoder circuit of FIG. 1.

Referring now to FIG. 1 of the drawings, there is shown a block diagram of the control system for a fluid distribution system having a plurality of normally closed electrically operable fluid valves V. Valves V may be any type of valve which is opened in response to an electrical signal, for example, solenoid valves or valves which are opened in response to the heating of an element therein, e.g., the Thermal Hydraulic Valve manufactured by the Rainbird Corporation. Each of the valves V is connected to a water supply conduit (not shown) and controls the supply of fluid in the conduit to separate outlets thereof. For example, each of the valves V may control the supply of water to the sprinkler heads on one green of a golf course or to the various paths of an irrigation system. It should be noted that, although only five valves V are illustrated, this is by way of example only and that any number of valves V may be provided.

Power for operating the various valves is supplied via a two-wire power line system 10, 11, which is connected to a convenient power source. In the illustrated control system, the power supplied by the two-wire power line 10, 11 is a low voltage d.c. power, e.g. 28 volts d.c. Although the two-wire power line 10, 11 is illustrated as containing two branch connections, it is to be understood that this is for illustrative purposes only and is not essential for system operation. Additionally, more such branch circuits of the wires 10, 11 of the power line may be utilized if desirable.

To control the application of power to the various valves V, and hence selectively energize and deenergize same, each of the valves V is coupled to the two wires 10, 11 via a respective decoder circuit 12 which normally prevents the application of power from the lines to the valves V. Each of the decoder circuits 12 is uniquely tuned to a different one of a plurality of discrete frequency signals and responds to a signal of the associated frequency signal to connect the associated fluid valve V across the power lines 10, 11. As indicated by the different numbers in the decoder circuits 12, each of the decoder circuits may be responsive to any one of the signals in the sequence of discrete frequency signals and it is not necessary that adjacent decoders 12 be responsive to adjacent frequency signals. Preferably, in order to simplify and minimize the cost of the system, the various frequency control signals are transmitted to the decoder circuits 12 via the two-wire power lines 10, 11. It is to be understood, however, that if desired the various frequency signals for controlling the decoder circuits 12 may be transmitted thereto via radio communications links, i.e. utilizing RF energy. In such case, however, the cost of the installation would be increased since additional equipment, e.g., antennas, RF receivers, etc., would be required.

The frequency signals required to selectively control the decoding circuits 12, and hence the valves V, are provided by a pre-programmed controller 14. The controller 14 may theoretically include any type of frequency source capable of producing each of the discrete frequency signals to which the decoders 12 respond and which is pre-programmed with respect to the time and duration each of the frequency signals is to be generated. Preferably, according to the invention, the controller 14 includes an N-channel encoder circuit 16 which is capable of producing each of the N different frequency signals required to control the N-decoder circuits 12, and a programming circuit 18, the output signals of which determine which of the N different frequency signals are to be generated. That is, the programming circuit 18 functions as a timing control for the N-channel encoder circuit 16. The output signals from the N-channel encoder circuit 16, which in the illustrated example are in the 10–35 KHZ range, are superimposed on the d.c. power lines 10, 11 for transmittal to the decoders 12.

As indicated above, one of the primary considerations of the present system is the ability to be able to randomly and simultaneously energize a plurality of the valves V. Although this could possibly be done by simultaneously applying the programmed different frequency signals generated in the encoder 16 to the power lines 10 and 11, such an arrangement would present serious problems since the summation of two or more of the generated frequency signals could result in a frequency to which one of the undesired decoders 12 responds, hence resulting in the energization of an unwanted valve V. In order to eliminate this type of possible error, and to greatly simplify the system, although the programming circuit 18 can simultaneously enable any number of the desired channels of the encoder 16, only a signal of a single frequency, e.g. a 1.5 volt peak-to-peak square wave in the above-mentioned frequency range, is generated at the output of the encoder 16 at any given instant. This is achieved by providing the encoder with a time division multiplexing arrangement so that the desired frequency signals enabled by the programming circuit 18 appear at the output of the encoder 16 according to the sampling sequence of the multiplexer. Since each of the decoder circuits 12 would then normally only energize the associated valve V during the time that the single associated frequency signal is present on the lines 10, 11, according to the invention each of the decoder circuits 12 is provided with a time delay detector circuit which, once it has responded to an input signal of the associated frequency, maintains the associated valve in the energized condition for a period of time longer than the sampling rate of the multiplexer. That is, the time delay of each decoder should be longer than the time required for the multiplexer to complete one cycle and scan all of the channels.

To provide for the ability to override the controller 14 when it is desired for example to turn on a particular one of the valves V without requiring that the operator return to the central location, according to a further feature of the invention, a plurality of connectors 20 are provided at spaced locations along the two-wire power line 10, 11 by means of which a portable N-channel encoder 22 may be connected across the power lines 10 and 11 by means of a mating connector 24. Although only two connectors 20 are shown, it should be understood that as many connectors 20 as desired may be randomly spaced along the entire two-wire power line.

The portable encoder 20 is designed so that it derives its power from the two-wire line 10, 11 and is capable of providing an output signal of any one of the frequencies to which the decoders 12 are responsive. The particular one of the output frequencies generated by the encoder 20 is determined for example by a selector switch mounted thereon. Additionally, in order to disable the output signal from the N-channel encoder circuit 16, the portable encoder 20 simultaneously and continuously provides an additional output signal of a pilot tone frequency which is substantially higher than the range of frequencies generated by the encoder 16, for example, 223 KHZ. This pilot tone signal is detected by a pilot tone detector or control circuit in the encoder 16 which disables the output signals therefrom so that the decoders 12 are now being controlled solely by the output signal from the portable encoder 22. Once the portable encoder 22 is turned off or unplugged from the connector 20, the pilot tone signal is removed from the two-wire power line 10, 11 and accordingly control via the fixed or stationary encoder 16 continues.

Figure 2:
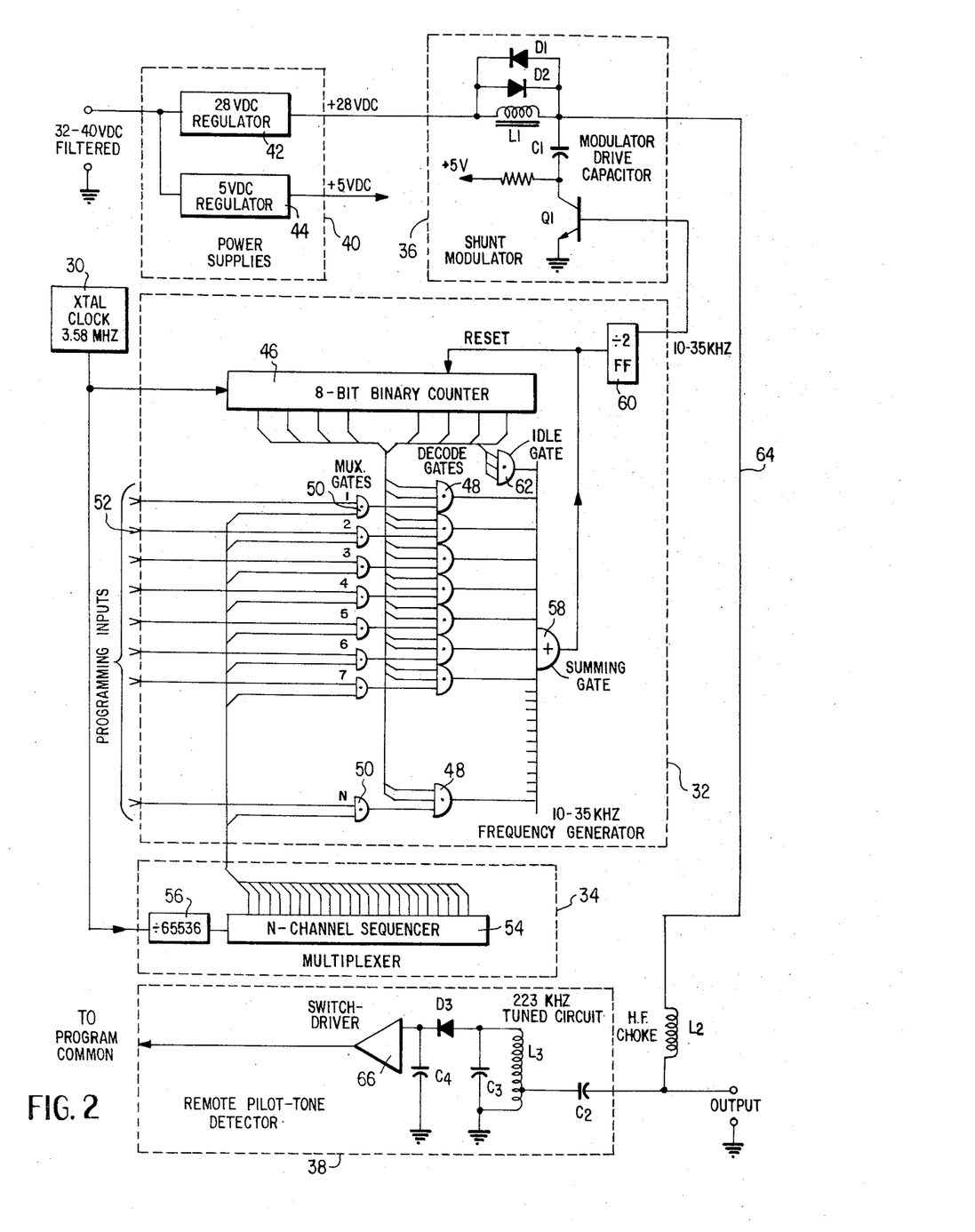
FIG. 2 is a schematic circuit diagram of the preferred embodiment of the fixed N-channel encoder of FIG. 1.

Turning now to FIG. 2, there is shown a detailed circuit arrangement for the encoder 16 of FIG. 1. The encoder 16 basically consists of a crystal controlled oscillator or clock pulse generator 30, a 10–35 KHZ variable frequency generator 32, a multiplexer 34, a shunt modulator 36, a remote pilot tone detector 38, and a power supply unit 40 for the encoder. The power input to the system, which as indicated is filtered 32–40 volts d.c., is fed to the input of each of a 28 volt d.c. regulator 42 and a 5 volt d.c. regulator 44 contained in the power supply unit 40. The output of the regulator 42, is fed via an inductance L1 of the shunt modulator 36 and a high frequency choke L2, whose function will be described below, to the output terminals of the encoder 16 which are connected to the two wire power line 10, 11 (FIG. 1). The d.c. output signal of the regulator 44 is utilized to power the internal logic of the encoder 16.

To generate the discrete frequency signals needed to control the various valves V, the output signal of the crystal controlled oscillator 30, which in the present example is running at 3.58 MHZ, is fed to the input of an 8 bit binary counter 46 which in a well known manner serves as a frequency divider for the clock pulses. To provide the different frequency signals required for the system, a plurality of decode AND gates 48, one for each of the N different frequency signals required, is provided. Each of the decode AND gates 48 has a plurality of inputs which are connected to a different combination of the true outputs of the various stages of the binary counter 46. Consequently, each of the decode AND gates 48, when enabled, produces an output signal when the binary counter 46 reaches a different count associated therewith, which different counts represent the different desired frequencies.

In order to selectively enable particular ones of the decode AND gates 48, and hence determine the particular frequency or frequencies being produced at any given time, each of the decode AND gates 48 is provided with a further enabling input which is connected to the output of an associated one of a sequence of N multiplexing AND gates 50. Each of the multiplexing AND gates 50 has a pair of inputs, one of which constitutes an input 52 for the output signals from the programming circuit 16 (FIG. 1), while the other one of which is connected to one of the outputs of an N-channel sequencer or sampling switch 54 in the multiplexer 34. The N-channel sequencer 54 is continuously driven by the output pulses from the crystal controlled oscillator or clock 30 which has been divided in a frequency divider 56. Consequently, the output signals from the N-channel sequencer 54 sequentially enable each of the multiplexing AND gates 50 for a period of time, and depending on which of the gates 50 have been selected by means of an input signal on the associated programming input 52, cause the associated decode AND gate 48 to be enabled for the corresponding period of time.

The output signals from each of the decode AND gates 48 are connected to the inputs of a summing gate 58, i.e. an OR gate, which consequently provides an output signal each time any one of the decode AND gates 48 produces an output signal. Accordingly, whenever the preset binary count associated with the enabled one of the decode AND gates 48, as determined by the connections of the inputs thereto to stages of the binary counter 46, is reached, the output signal of the gate 48 causes the summing gate 58 to produce an output signal which resets the binary counter 46 to begin counting again. This counting and resetting is repeated as long as the particular gate 48 is enabled. Thus, the decode AND gates 48 fix the maximum count which can be accumulated in the binary counter 46.

The output signals from the summing gate 58 are also fed to the input of a flip-flop 60 to toggle same. The output of the flip-flop 60 is thus a precise square wave whose accuracy is equal to that of the crystal reference in the clock pulse generator 30 and whose frequency is determined by the particular one of the decode AND gates 48 enabled at that particular instant of time.

The output signals from the flip-flop 60, which constitute the 10–35 KHZ output signals from the frequency generator 32, are fed to the base of a transistor Q1 of the shunt modulator circuit 36. This shunt modulator circuit basically includes the transistor Q1 whose emitter to collector path is connected in series with the modulator drive capacitor C1 and in shunt with the output terminals for the power line, and the inductance L1 connected in the power line. Consequently, the square wave signals supplied to the transistor Q1 will vary the state of conduction thereof, resulting in alternately charging and discharging of the capacitor C1 in accordance therewith and hence the modulation of the d.c. power line signal. The diodes D1 and D2 connected in anti-parallel across the inductance L1 merely serve to limit the maximum peak-to-peak voltage developed across inductance L1 to a desired value, in the instant case at 1.5 volts, and at the same time make the amplitude of the signal insensitive to the d.c. load on the power line up to a value of several amperes.

To prevent the modulator drive capacitor C1 from discharging during any period of time when none of the decode AND gates 48 is enabled, and thereby avoid the severe transient which would be generated when the capacitor C1 is charged from zero signal to full signal, the frequency generator 32 is provided with an additional AND gate, i.e. idle gate 62, whose inputs are connected to the true outputs of the stages of binary counter 46 corresponding to a count which is greater than that associated with any of the decode AND gates 48. This idle gate 62 does not require any separate enabling signal, and consequently produces an output signal each time its associated count is reached, which can only occur when none of the other gates 48 is open. The output of the idle gate 62 is also connected to one of the inputs of the summing gate 58, and consequently results in the generation of an idle frequency, for example of 8.9 KHZ, which is applied to the shunt modulator 36 to prevent the capacitor C1 from completely discharging.

Connected in series with the output line 64 of the shunt modulator 36 between the conductance L1 and the output terminal of the encoder is a high frequency choke L2. This high frequency choke L2 is provided in order to provide a high impedance to the high frequency pilot tone, e.g. 223 KHZ, which may be generated by the portable encoder and hence isolate the modulator 36 from this pilot tone signal. The high frequency choke L2, however, is not seen by the 10–35 KHZ square wave signals provided by the shunt modulator 36. With this arrangement, when the output signals from the frequency generator 32 are controlling the valves V, the power signal, i.e. 28 volt d.c., is modulated by means of L1–C1, so that combined power plus signal then flow through the line 64 and the high frequency choke L2 to the output terminals and then to the two-wire line 10, 11.

As indicated in the description of FIG. 1, whenever the portable encoder 22 is energized, it produces a high frequency pilot tone signal, e.g. 223 KHZ, which is then applied to the two-wire line 10, 11 in addition to any 10–35 KHZ signal which may be present on the line from the fixed encoder circuit 16 or the portable encoder circuit 22. In the fixed encoder 16, this high frequency pilot tone is detected by means of a pilot tone detector circuit 38 whose input is connected to the output terminals of the encoder 16. The pilot tone detector circuit 38 includes a series capacitor C2 which blocks the d.c. power in the line and couples the frequency signals appearing at output terminals of the encoder to a tank circuit L3–C3 which is tuned to the frequency of the pilot tone signal. The output signal of the tank circuit is applied via a series diode D3 and a shunt connected capacitor C4 to the input of a switch driver amplifier 66. The output of the switch driver amplifier 66 is utilized to disconnect or disable the program common voltage line, i.e. the line from which all of the programming inputs 52 derive their voltage, so that any of the inputs 52 which would normally be activated are deactivated. Consequently, once the switch driver amplifier 66 is energized no frequency signals to which any of the decoders can respond are being produced by the frequency generator 32 and the portable encoder 22 is then free to assume control of the system. Note that disabling the output signals from the frequency generator 32 by removing the program common voltage rather than by for example deenergizing the entire controller 14, has the advantage that the time sequence of the programming operation will continue in its normal manner.

FIG. 3 shows the circuit diagram for each of the decoders 12. As indicated above, the decoders are connected across the two-wire line 10, 11 in any order and at virtually any distance from the fixed encoder 16. However, in order to provide for proper operation of the system, the wire size of the wires 10, 11 should be selected so that a maximum voltage drop of 2 to 3 volts is experienced at the decoder furthest from the fixed encoder 16. At the input of the decoder, the 28 volt d.c. power with the 1.50 peak-to-peak 10–35 KHZ signal appears. The signal appearing at the input is fed through a rectifier D5 and then serves as the power fro all of the components in the decoder. The a.c. signal appearing at the input, i.e. the 10–35 KHZ signal, is fed via a d.c. decoupling capacitor C7 to the input of a tank circuit L4–C4 which is tuned to one of the frequencies in the 10–35 KHZ range. The signal developed at the output of the tank circuit L4–C4 is rectified by a diode D4 and applied to the base of a transistor Q2 which is connected as an emitter follower having a capacitor C6 as the emitter impedance thereof. The output of the emitter follower is fed to the input of a threshold detector 70, for example, a Schmitt trigger, which produces an output whenever the charge on the capacitor C6 exceeds a predetermined value. The output signal from the threshold detector 70 controls a normally open power switch 72, e.g. a Darlington power transistor pair. The closing of the power switch 72, in turn completes the power circuit through the load 74, i.e. the electrically operable valve, to energize and hence open same.

Upon receipt of the frequency signal to which the tank circuit L4, L5 is tuned, the output voltage of the tank circuit will bias the transistor Q2 to the conducting state so as to cause charging of the capacitor C6 via the collector emitter path of the transistor Q2. In order to ensure that the decoder circuit is only responsive to the particular frequency to which the associated tank circuit L4–C5 is tuned, the threshold voltage at which the threshold detector 70 responds is adjusted so that the output signal from the tank circuit L4–C5 will only cause the transistor Q2 to permit charging of the capacitor C6 to this threshold value when the input frequency signal to the tank circuit is within ± 2 percent of the resonant frequency of the tank circuit.

With the decoder circuit arrangement illustrated, as a result of the emitter follower action of the transistor Q2, the capacitor C6 will be rapidly charged whenever the frequency signal to which the associated tank circuit L4–C5 is tuned is received. However, as a result of the high input impedance of the threshold detector 70, the discharge time or decay time for the capacitor C6 is very slow. As indicated above, the discharge or decay time for the capacitor C6 is adjusted in a well known manner so that it is longer than the cycle time of the multiplexer 34, i.e. the time required for the multiplexer to sequentially enable each of the multiplexing gates 50 of FIG. 2. As a result of this fast charge slow discharge characteristic for the detector circuit, the frequency signals appearing sequentially on the power lines 10, 11 in time division multiplex can simultaneously turn on as many decoders, and hence as many fluid valves as desired. For example, in a system containing 24 channels wherein each of the desired frequencies is applied to the line for 10 milliseconds, resulting in a total cycle time for the multiplexer of 240 milliseconds, each decoder is provided with a decay time of approximately 500 milliseconds in order to ensure an adequate safety margin.

Figures 4, 5:
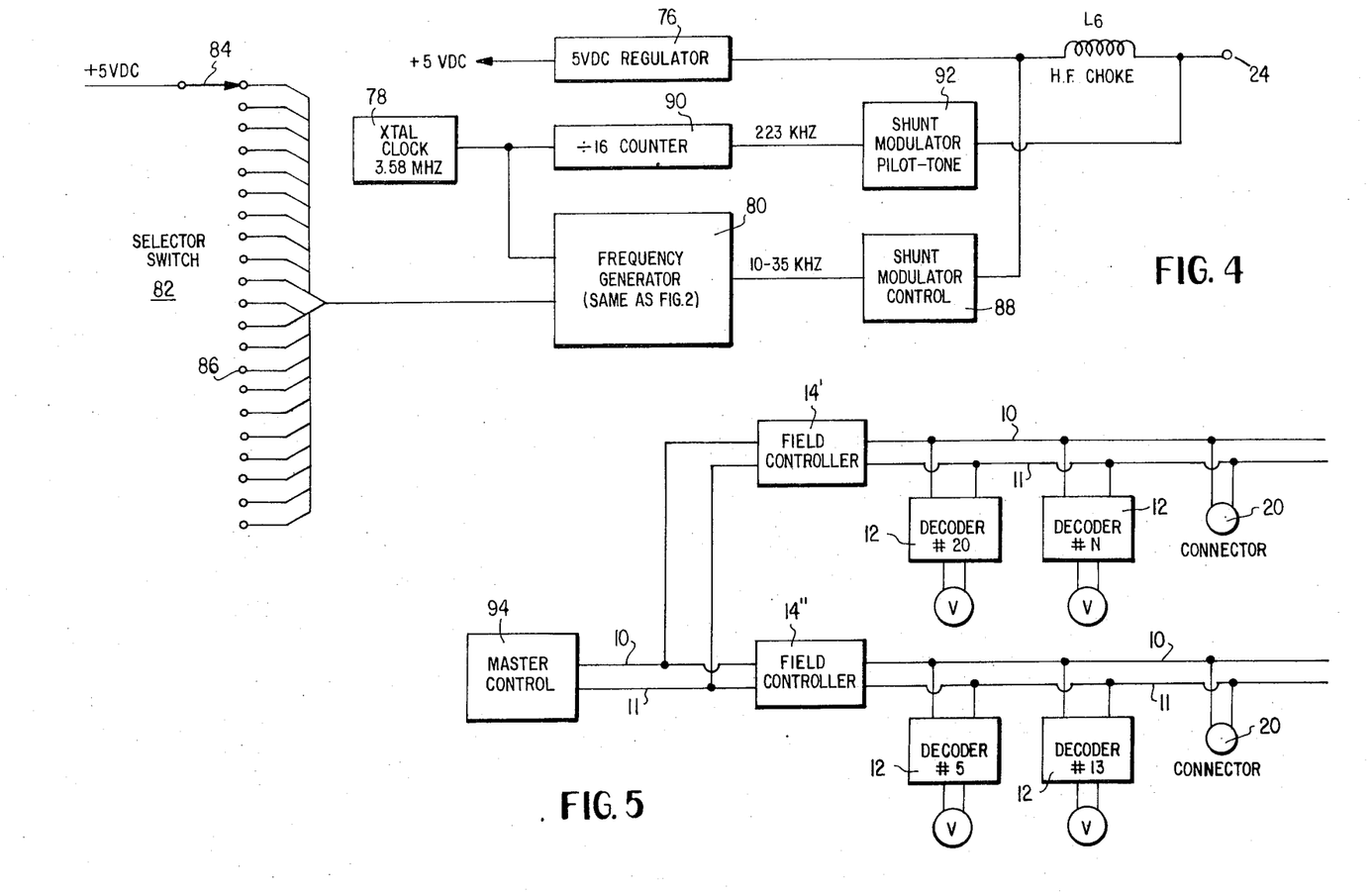
FIG. 4 is a block diagram of the preferred embodiment of the portable encoder of FIG. 1.
FIG. 5 is a block diagram illustrating a modification of the basic system of FIG. 1.

Turning now to FIG. 4, there is shown a block circuit diagram of the portable encoder 22 of FIG. 1. In the illustrated circuit, power for the portable encoder is taken from the lines 10, 11 via the connector 24 and fed to a 5 volt d.c. regulator 76 which supplies the actual operating power for the encoder. The desired frequencies for controlling the valves, are generated in the portable encoder in a manner which is very similar to that of the fixed or stationary encoder 16. As illustrated, the output pulses from a crystal controlled oscillator or clock 78 which is running at the same frequency as the clock 30 of the stationary encoder, e.g. 3.58 MHZ is fed to a frequency generator 80 which is essentially the same as the frequency generator 32 of FIG. 2 but does not include the plurality of multiplexing gates 50. That is, each of the input leads corresponding to the program input leads 52 of FIG. 2 is directly connected to one input of the associated decode AND gates 48. In the portable encoder, instead of the selection of the particular frequency to be generated being made by means of a program circuit, the particular frequency signal to be generated is selected one at a time by means of a selector switch 82. That is, by selectively positioning the wiper 84 on one of the contacts 86 of the switch, the associated decode AND gate 48 in the frequency generator 80 will be enabled resulting in the associated frequency being generated. The output signal from the frequency generator 80 is fed to a shunt modulator 88 for the control signals which then modulates the power in the two wire line 10, 11 in a manner similar to that of the shunt modulator 36 above.

The output pulses from the clock pulse generator 78 are also fed to a binary counter 90 which divides the frequency of the clock pulses by 16 and hence operates as a frequency divider to provide the pilot tone signal (233 KHZ) at its output. This pilot tone signal is utilized as indicated above to disable the frequency generator 32 when the portable encoder is operating. The pilot tone signal appearing at the output of the counter 90 is fed to a shunt modulator 92 which in a similar manner to the modulator 88 applies the output signal thereof to the two wire line 10, 11 via the connector 24. As illustrated, as in the stationary encoder of FIG. 2, the output of the shunt modulator 88 for the output signals from the frequency generator 80 is connected to the power line 10, 11 via a high frequency choke L6 in order to isolate the high frequency pilot tone signal from the control frequencies.

Turning now to FIG. 5, there is shown a modification of the basic system of FIG. 1 which provides for greater flexibility with respect to the control of individual valves V and in particular for greater flexibility with respect to control by the portable encoder. According to this variation, instead of controlling all of the decoders 12 in the system via a single centrally located controller 14, a plurality of field controllers 14', 14'', each of which is similar to the controller 14 of FIG. 1 are provided. Each of the field controllers 14', 14'' directly controls only a portion of the total number of decoders in the total fluid distribution system, and are located throughout the field of the distribution system for example in close proximity to the decoders 12 which they directly control. For example, in the illustrated embodiment, the field controller 14' would control the decoder No. 20 and the decoder No. N while the field controller 14'' would control the decoder No. 5 and the decoder No. 13. Control of the entire fluid distribution system from a central location is provided by means of a master control 94 which in this case need only contain sufficient circuitry to selectively turn the field controllers 14' and 14'' on or off, and may additionally contain provision for advancing the field controllers to a home program position. In order to provide for this control of the field controllers 14' and 14'' by the master control 94, each of the field controllers may be provided with an additional circuit such as the detector circuit 38 of FIG. 2 which responds to a signal of a frequency outside of the range of the other frequency signals utilized in this system. The output signal from such a detector circuit could then be utilized to control the power input to the associated field controller 14', 14''. Preferably, the output signal from this tone detector circuit will be utilized to control a bistable switching arrangement, such as a flip-flop, so that the associated field controller will be alternately enabled or disabled each time a control signal of the associated frequency is received. With such an arrangement, the master controller 94 need only have the capability, in the simplest case, of selectively providing the various frequency control signals necessary to control the field controllers 14', 14''.

In a similar manner, the portable encoder 22 of FIG. 1 may be modified so that it can provide each of the different frequency tone signals required to selectively control the field controllers 14' and 14''. For example, this may easily be accomplished by modifying the circuit of FIG. 4 so that it includes an additional frequency generator such as the generator 80 for generating the various control tones necessary to control one of the field controllers 14' and 14'', and an additional selector switch or plurality of pushbuttons for determining which of these additional tones is to be generated. Additionally, a further shunt modulator for this additional frequency generator would be required. Moreover, since with this type of arrangement it is not desired that all of the field controllers be disabled in the event a subsequent one of the control tones generated by the frequency generator 80 is desired, the circuit of FIG. 4 should further be modified to provide a switching arrangement for disabling the output of the shunt modulator 92 whenever only a single one of the field controllers 14', 14'' is being controlled by the portable encoder.

With the modified system shown in FIG. 5, it is thus possible either by means of the master control 94 or the modified portable encoder to selectively control only a portion of the total number of decoders 12 and the associated valves. For example, if it is desired to turn off the valve associated with the decoder No. 5 at a time when as a result of the programs in the field controllers 14' and 14'' all of the illustrated valves are open, the portable encoder may be connected to the two wire lines 10, 11 via one of the connectors 20 and the control tone for the field controller 14'' generated. This will disable the output signals from the field controller 14', thus disabling the flow of output signals therefrom and causing both of the valves associated with the decoders No. 5 and No. 13 to close. During this time, the field controller 14' is unaffected and hence the decoders No. 20 and No. N continue to respond. Thereafter, by proper placement of the selector switch 82, the frequency signal associated with the decoder 13 may be generated, causing the associated valve to open while permitting the valve associated with the decoder 5 to remain closed. As can easily be appreciated, various other combinations of selective control of the valves V may be easily achieved in this manner.

It will be understood that the above description of the present invention is susceptible to various modifications, changes and adaptations, and the same are intended to be comprehended within the meaning and range of equivalents of the appended claims.

I claim:

1. A frequency selective control system comprising in combination
   a source of electrical power;

a two-wire power line connected to said power source;

a plurality of electrically operable devices spaced along said power line;

a like plurality of frequency selective circuit means, one for each of said electrically operable devices, each of said frequency selective circuit means being responsive to an input signal of a different predetermined frequency for selectively connecting its associated electrically operable device across said two-wire power line to energize same;

a programmed stationary encoder circuit means for selectively providing output signals of said different predetermined frequencies, said encoder circuit means including time division multiplexing means for causing said encoder circuit means to continuously provide the output signals of selected different frequencies in a predetermined sequence and for a predetermined time within said sequence;

means for coupling the output signals from said encoder circuit means to the input of each of said frequency selective circuit means;

a portable encoder circuit means for selectively providing an output signal of a selected one of said predetermined different frequencies and for simultaneously providing a pilot tone output signal having a predetermined frequency which is substantially higher than the range of frequencies provided by said stationary encoder circuit means;

control circuit means responsive to said pilot tone signal for causing said stationary encoder circuit means to cease providing output signals whenever said pilot tone signal is being received; and means for coupling the output signals from said portable encoder circuit means to the inputs of said plurality of frequency selective circuit means and said control circuit means whenever said portable encoder circuit means is energized.

2. The apparatus defined in claim 1 wherein said electrically operable devices are normally closed fluid valves, each of which leads to at least one separate outlet and each of which is connected to a fluid supply conduit, whereby said system comprises a remotely controlled selective fluid distribution system.

3. The apparatus defined in claim 1 further including a plurality of plug type connectors connected across said power line at spaced intervals, and a mating plug type connector for connecting the output of said portable encoder circuit means across said power line, and for supplying power to said portable encoder circuit means.

4. The apparatus defined in claim 3 wherein the input of said control circuit means and the inputs of each of said frequency selective circuit means are connected across said power line; and wherein said coupling means for the output signals of said stationary encoder circuit means includes a first means for modulating the electrical power signal in said power line with the output signals from said stationary encoder circuit means; and wherein said coupling means for the output signals from said portable encoder circuit means includes a second means, contained in said portable encoder circuit means, for modulating the power signal in said power line with the output signals from said portable encoder circuit means.

5. The apparatus defined in claim 4 wherein said first and second means for modulating are shunt modulators.

6. The apparatus defined in claim 1 wherein said stationary encoding circuit means comprises:

a source of clock pulses;

a multistage binary counter for counting the clock pulses;

a plurality of decode AND gates, one for each of the predetermined different frequencies, each of said gates having a plurality of inputs connected to a different combination of the outputs of the stages of said binary counter corresponding to different predetermined counts of said binary counter;

a further plurality of AND gates each of which has its output connected to a further input of a separate one of said decode AND gates, each of said further plurality of AND gates having a pair of inputs with one of said pair of inputs of each of said gates being connected to the output of said multiplexing means;

programming means for applying a signal to the other input of selected ones of said further plurality of AND gates according to a predetermined program to determine the frequencies which are to be generated and the times therefor;

a summing gate means responsive to an output signal from any of said decode AND gates for providing an output pulse which resets said binary counter to begin counting again; and a flip-flop connected to the output of said summing gate means and toggled by the output pulses therefrom whereby the output of said flip-flop constitutes the signal of the desired frequency.

7. The apparatus defined in claim 6 wherein said stationary encoder means includes a further decode AND gate having its inputs connected to a combination of outputs of the stages of said binary counter which correspond to a count greater than that to which any of the other decode AND gates responds, and its output connected to an input of said summing gate means.

8. The apparatus defined in claim 6 wherein said control circuit means includes means for disabling the output signals from said programming means whenever said pilot tone signal is received.

9. The apparatus defined in claim 1 wherein each of said frequency selective circuit means comprises:

a tank circuit tuned to a particular frequency;

a capacitive circuit means having a fast charge-slow discharge characteristic connected to the output of said tank circuit, said capacitive circuit means having a discharge time which is long relative to the sampling rate of said multiplexing means; and means responsive to the voltage across the capacitor of said capacitive circuit means for completing the power circuit between said powerline and the associated electrically operable device, whereby a plurality of said electrically operable devices may be continuously and simultaneously energized.

10. The apparatus defined in claim 9 wherein said capacitive circuit means includes a transistor connected as an emitter follower and a storage capacitor connected in the emitter circuit path thereof; and wherein said means for completing the power circuit includes a Schmitt trigger having its input connected across said storage capacitor and its output connected to a power switch, said power switch, when closed, connecting said electrically operable device across said powerline.

11. The fluid distribution system defined in claim 2 wherein said portable encoder circuit means includes:
   a source of frequency clock pulses;
   a frequency divider means connected to the output of said source of clock pulses for providing said pilot tone signal at the output thereof;
   a frequency generator for selectively providing an output signal having one of said plurality of different predetermined frequencies; and
   selector means for controlling the output frequency of said frequency generator.

12. The fluid distribution system defined in claim 11 wherein said frequency divider means is a multistage binary counter.

13. The fluid distribution system defined in claim 12 further including a plurality of plug type connectors connected across said power line at spaced intervals, and a mating plug type connector for connecting said portable encoder circuit means across said power line, and for supplying power to said portable encoder circuit means, and
   wherein: the input of said control circuit means and the inputs of each of said frequency selective circuit means are connected across said power line; said coupling means for the output signals of said stationary encoder circuit means includes a first means for modulating the electrical power signal in said power line with the output signals from said stationary encoder circuit means; and said coupling means for the output signals from said portable encoder circuit means includes a second and third means, contained in said portable encoder circuit means, for modulating the power signal in said power line with the output signal from said frequency divider means, and said frequency generator respectively.

14. The fluid distribution system defined in claim 13 wherein said first, second and third modulating means are shunt modulators.

15. The fluid distribution system defined in claim 14 wherein said stationary encoding circuit means comprises:
   a source of clock pulses;
   a multistage binary counter for counting the clock pulses;
   a plurality of decode AND gates, one for each of the predetermined different frequencies, each of said gates having a plurality of inputs connected to a different combination of the outputs of the stages of said binary counter corresponding to different predetermined counts recited by said binary counter;
   a further plurality of AND gates each of which has its output connected to a further input of a separate one of said decode AND gates, each of said further plurality of AND gates has a pair of inputs with one of said pair of inputs of each of said gates being connected to the output of said multiplexing means;
   programming means for applying a signal to the other input of selected ones of said further plurality of AND gates according to a predetermined program to determine the frequencies which are to be generated and the times therefor;
   a summing gate means responsive to an output signal from any of said decode AND gates for providing an output pulse which resets said binary counter to begin counting again; and
   a flip-flop connected to the output of said summing gate means and toggled by the output pulses therefrom whereby the output of said flip-flop constitutes the signal of the desired frequency.

16. The fluid distribution system defined in claim 14 wherein the outputs of said first and third shunt modulators are connected to said power line via a high frequency choke which presents a high impedance to signals of the frequency of said pilot tone signal.

17. The fluid distribution system defined in claim 2 further including a plurality of said stationary encoder circuit means spaced in the field throughout said distribution system, each of which selectively provides the frequency signals for a portion of the total number of said fluid valves, each of said stationary encoder circuit means including a further control circuit means responsive to a control signal of a different frequency for alternately enabling or disabling the associated stationary encoder circuit to provide output signals each time a control signal of the associated frequency is received; and a central master controller having its output connected to each of said further control circuit means for selectively providing said control signals.

18. The fluid distribution system defined in claim 17 wherein said portable encoder circuit means includes means for selectively providing an output signal having the frequency of one of said control signals for said stationary encoder circuit means.

* * * * *